June 19, 1956  A. H. KUHNEL  2,751,535
POSITION CONTROL SYSTEM
Filed June 18, 1953
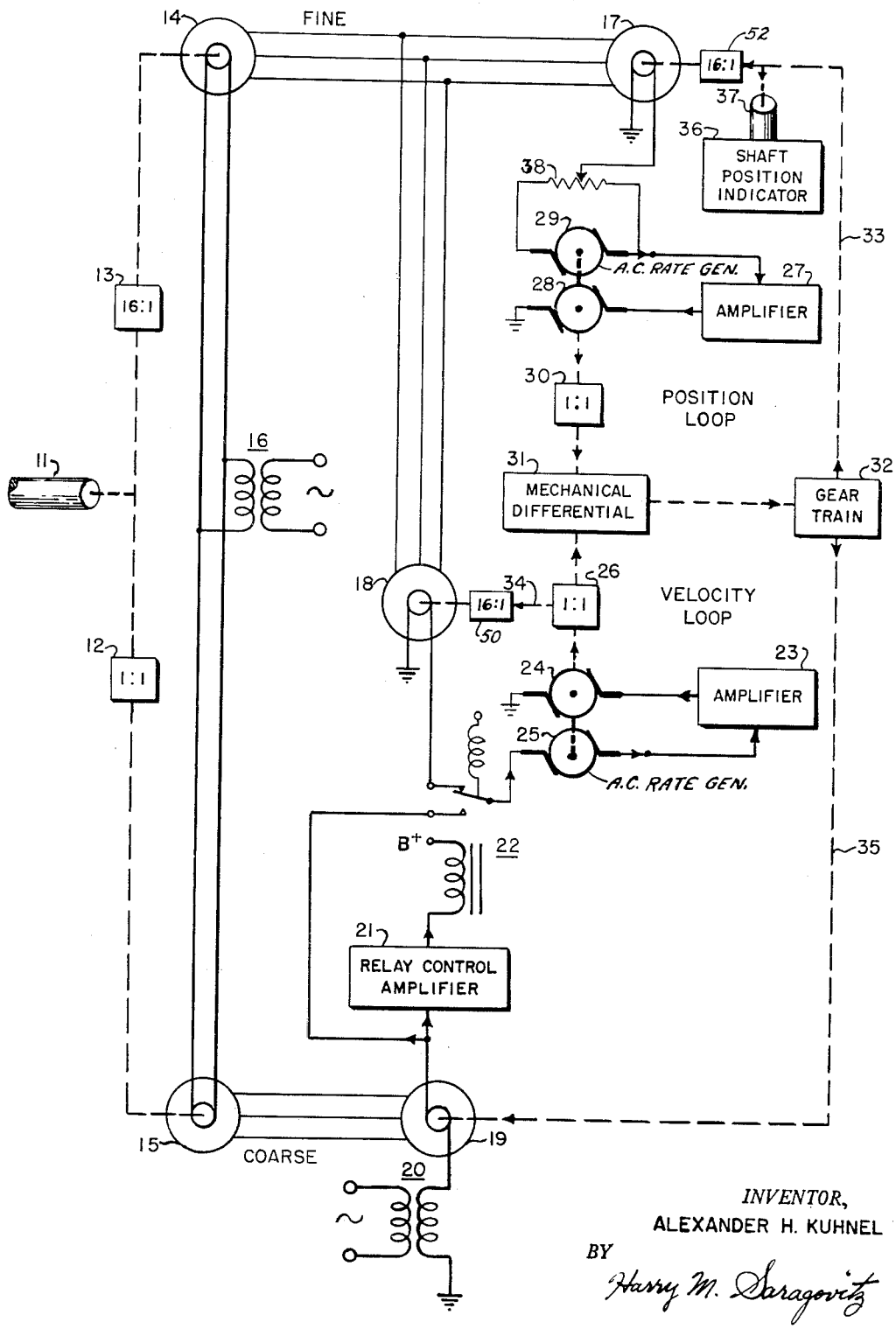
INVENTOR,
ALEXANDER H. KUHNEL
BY
Harry M. Saragovitz
ATTORNEY United States Patent Office 2,751,535
Patented June 19, 1956

2,751,535
POSITION CONTROL SYSTEM

Alexander H. Kuhnel, Mount Vernon, N. Y., assignor to the United States of America as represented by the Secretary of the Army Application June 18, 1953, Serial No. 362,643

6 Claims. (Cl. 318—19)

This invention relates to a position control system and more particularly to one including a novel fine error signal voltage system for driving a first object into precise positional alignment with a second object.

As is well known in the art, there are two general classifications of servo control systems. The first is known as a velocity or rate servo system and is characterized by the fact that it produces a torque proportional to the rate of change of the displacement of a control member from a reference position. In such a servo system, if an abrupt change is made in the input, the feedback voltage, which is a measure of the rate of said change, begins immediately to approach the input voltage. As it does so, the error and torque decrease with a resultant exponential approach to equilibrium. One of the drawbacks of this type of system is that, dependent on the rate of change, there is always some residual error between the positions of the control and driven members.

The second general type of servo system is the position servo. It is characterized by the fact that it develops a torque proportional to the extent of displacement of a control member from a reference position. In other words, the position servo feedback is a measure of the position of a control member and since this is an integral of velocity, it will not develop a feedback voltage which immediately starts toward an input voltage. A characteristic of this type of servo system is that at the time the driven member is driven into alignment with the control member, that is, at the time the error between the two becomes zero, the velocity is not zero and the position servo tends to overshoot and hunt. This type of servo system is normally used where small displacements at low velocity are required to be followed, for in such cases the characteristics of the system enable it very closely to reproduce the position of the control member.

An object of the present invention is to provide a novel and improved servo system in which the close following characteristics of the velocity servo and the accurate position reproduction characteristics of the position servo are combined.

A further object of this invention is to provide a novel servo system in which the position of a control member may be very precisely followed or reproduced in a driven member.

A further object of this invention is to provide a coarse-fine servo system employing two channels for the fine servo portion of the system, one of the channels including a velocity servo loop and the second a position servo loop.

Still another object of this invention is to provide a servo system which comprises a pair of channels connected in parallel to a source of control voltage having a characteristic proportional to the displacement of a control member from a reference position, the first of said channels comprising a velocity servo loop and the second of said channels comprising a position servo loop, and also including means connected for control by the output of the velocity and position servo loops, the output of the velocity servo loop being fed to the rotor of the velocity servo and the combined outputs of the velocity and position servo loops being fed to the position servo rotor, said combined outputs being utilized to control the position of the driven member.

In order that the invention may be clearly understood, reference will now be made, by way of example, to the accompanying drawing which is a block diagram of a preferred embodiment of the invention.

Referring now to the drawing, there is shown a control member 11 represented in the drawing as a shaft, but which, it is to be understood, may be any device, the position of which it is desired to reproduce. Shaft 37 is the driven object which reproduces the position of shaft 11 in a manner which will be explained more fully below. Shaft 11 is coupled through a set of 1 to 1 gears 12 to the rotor of a coarse servo transmitter 15. The shaft 11 is also coupled through another set of gears 13 having, for example, a 16 to 1 gear ratio, to the rotor of a fine servo transmitter 14. It is, of course, understood that other gear ratios may be employed according to the requirements of the system. The rotors of servo transmitters 14 and 15 are supplied with A. C. voltage through a transformer 16. Upon rotation of shaft 11, there is developed at the outputs of servo transmitters 14 and 15, fine and coarse control signals, respectively, having a characteristic proportional to the extent of rotation of the shaft 11 from a reference position.

The coarse signal voltage from transmitter 15 is fed to the stator windings of a servo receiver 19 and develops an error signal across the rotor of servo receiver 19. This error signal is amplified by relay control amplifier 21 and, if the signal is greater than the predetermined amplitude, the relay 22 is energized, thereby connecting the amplifier 23 to the rotor of the servo receiver 19. When so connected, amplifier 23 amplifies the error signal, supplies it to a motor 24, which in turn drives a mechanical differential 31 through a 1 to 1 set of gears 26. The output of the mechanical differential 31 is fed through a gear train 32 to a mechanical coupling 35 which corrects the position of the rotor of servo receiver 19 until the output of said receiver drops below the level sufficient to actuate relay 22. Gear 26 is also connected to the rotor of receiver 18, and gear 32 is connected to the rotor of receiver 17 as will be explained more fully below. When relay 22 is deenergized, amplifier 23 is disconnected from the receiver 19.

Transformer 20 serves to supply an alternating current of constant amplitude which is ordinarily termed an "anti-stick-off voltage" to prevent synchronization of the shaft 37 in a 180° relationship with shaft 11. The possibility of such synchronization occurs when an even numbered ratio of fine to coarse data transmission system is used. In practice, an anti-stick-off voltage of approximately three volts was used.

When relay 22 is deenergized, the velocity servo receiver 18 is connected to the amplifier 23. The fine signal fed from the stator of transmitter 14 to velocity servo receiver 18 develops an error signal across the rotor of said receiver. This error signal is amplified by amplifier 23 to an effective power level and the amplified signal is fed to the motor 24 to drive the same. The motor 24 is mechanically coupled to a drag cup generator 25, the function of which is to feed back to the amplifier 23 a signal proportional to the rate of change of the error signal supplied to receiver 18 or, putting it another way, proportional to the speed of the motor 24. The output of the motor is also fed through a 1 to 1 gear train 26 and a mechanical coupling 34 and a 16 to 1 gear 50 to the rotor of receiver 18 and drives the rotor to a position such that error signal output is substantially nulled. In the circuit actually used, the output of the generator was placed in series with the input of the amplifier 23, as illustrated schematically in the drawing. The velocity servo loop, consisting of receiver 18, amplifier 23, motor 24, generator 25, and the coupling 34 from the motor to the receiver 18, is well known in the art and typical velocity servo systems are illustrated in volume 21 of the "Radiation Laboratory Series," published in 1948 by the McGraw-Hill Publishing Company. See particularly Section 14–4 of said volume. A velocity servo loop including a generator having its output connected in series with the input to the amplifier is shown in Figure 12.36 of said volume 21.

The output of the velocity servo loop is also supplied to mechanical differential 31. This is a mechanical device, the output of which is one half the sum of the two inputs. Such devices are well known in the art, a typical differential being illustrated in Figure A, page 217, of "An Engineer's Illustrated Thesaurus," by Herkimer, published by the Chemical Publishing Company, Inc., in 1952. However, in the device illustrated in said book, the input shafts rotate in opposite directions so that the output is one half the difference of the two inputs, whereas, in mechanical differential 31, the input shafts rotate in the same direction so that the output is one half the sum of the two inputs.

The output of the mechanical differential 31 is fed through a 1 to 1 set of gears in gear train 32 and a mechanical coupling 33 to the rotor of position servo receiver 17 in such direction as substantially to null the output of said receiver. This receiver also receives the fine error signal from the servo transmitter 14. If there is a residual error signal developed across the rotor of receiver 17 after it has been moved by the output of the velocity servo loop, this error signal will be fed to amplifier 27. The amplifier amplifies the error signal to an effective power level and the output thereof drives the motor 28 which is mechanically coupled to a generator 29. An adjustable portion of the output of the generator taken from across potentiometer 38 is fed back to the input of amplifier 27.

The position amplifier 27 is a conventional high gain amplifier with an error damping network. It includes controls for phase and damping, and the amplitude of the signal fed from generator 29 to amplifier 27 is adjustable. Components 27, 28 and 29, in the position servo loop are well known in the art and therefore it is not necessary to discuss these circuits more fully. Typical position servo circuits for various requirements are illustrated in the aforesaid volume 21 of the Radiation Laboratory Series, supra.

The output of motor 28 is fed through a 1 to 1 set of gears 30 to the mechanical differential 31. As mentioned above, the output of the mechanical differential is fed back over coupling 33 to the rotor of the position receiver 17 in such sense as to reduce to substantially zero the residual error signal output of the position servo 17.

The gear train 32 is also mechanically coupled through a shaft 37 to a load 36, which is shown in the drawing to be a shaft position indicating means. The load may be any apparatus which it is desired to drive in coincidence with the control member of 11.

Summarizing the operation of the invention, the rotation of a control member 11 produces an error signal in the stator winding of control transmitter 14 and this, in turn, produces an error signal across the rotors of velocity receiver 18 and position receiver 17. The error signal developed across the rotor of receiver 18 produces a mechanical torque proportional to the rate of change of the error signal which is fed back to the rotor of 18 over mechanical coupling 34. The output of the velocity servo loop is also fed through a mechanical differential 31 and a mechanical coupling 33 and a 16 to 1 gear 52 to the rotor of the position receiver 17 so as to substantially null the error signal output of said receiver. Any residual error developed across the rotor of position receiver 17, due to an error between its position and the position of the shaft 11, is amplified by amplifier 27 which, in turn, drives motor 28. The output of the position servo loop is a mechanical torque proportional to the extent of the residual error which is combined in the mechanical differential 31 with the mechanical torque output of the velocity servo loop. The output of the mechanical differential is proportional to the sum of its two inputs. This summed output drives the rotor of the position servo receiver 17 to reduce to zero its output and also drives the load 36.

The coarse servo system is used only when the error signal output of receiver 19 is greater than a predetermined amplitude as, for example, during initial operation or after slewing. Then, said error signal is caused to energize a relay 22 which connects the coarse receiver 19 to a portion of the velocity servo loop. After the coarse receiver 19 drives the entire system through mechanical connections 34, 35 and 33 to reduce the error signal to smaller than the predetermined amount, said coarse receiver is disconnected from the system, as a result of deenergization of relay 22.

In the system actually used, the velocity servo loop followed the velocity of the control member 11 with lags on the order of 10 mils at 800 mils of angle per second. The position servo loop was able to reduce this to close to zero.

It will be appreciated that there may be deviations from the invention, as described, which still fall fairly within the spirit and the scope of the invention. Accordingly, it is desired that this invention not be limited by the particular details described herein xecept as defined by the patent claims.

What is claimed is:

1. In a servo system for changing the position of a first object in response to a change in position of a second object, means providing a voltage having a characteristic having a magnitude proportional to the displacement of said second object from a reference position, a pair of channels connected in parallel to said means for control thereby, the first of said channels comprising a velocity servo loop including a first receiver having an output proportional to said magnitude, and first means connected for control by said output for deriving therefrom a torque proportional to the rate of change of said magnitude, the second of said channels comprising a position servo loop including a second receiver having an output proportional to said magnitude, and second means connected for control by said output of said second receiver for deriving therefrom a torque proportional to the extent of change of said magnitude; the output of said first means being supplied to said first and second receivers in such sense as substantially to null the outputs of said receivers, and means for adding the outputs of said first and second means and supplying a torque proportional to the resultant thereof to said second receiver in such sense as to reduce to zero any residual voltage output therefrom, said first object being driven by said last-named means.

2. The servo system as claimed in claim 1, in which said torques are mechanical torques and said means for adding is a mechanical differential.

3. The servo system as claimed in claim 1, in which said first-mentioned means is a source of fine signals, and further including a source of coarse signals having a characteristic having a magnitude proportional to the displacement of said second object from a reference position, a third receiver connected to said source of coarse signals for control thereby, means responsive to an output of said third receiver greater than a predetermined value for disconnecting said first receiver from said first means and connecting said third receiver to said first means, and third means connected for control by the output of said first means for deriving therefrom a torque and for supplying said torque to said third receiver in such sense as to reduce the output thereof to less than said predetermined value.

4. The servo system as claimed in claim 1, in which said first means comprises a servo amplifier for amplifying the output of said first receiver, a motor driven by said amplifier, a drag-cup generator driven by said motor for providing an output proportional to the speed of said motor, the output of said generator being fed to the input of said amplifier for introducing therein a component proportional to the rate of change of the output of said first servo amplifier, the output of said motor being coupled to said first receiver in such sense as substantially to null the output thereof.

5. In a servo system for driving a first object into positional alignment with a second object; means providing a voltage representative of the displacement of said second object from a reference position; a pair of channels connected in parallel to said means for control thereby; the first of said channels comprising a velocity servo loop including a first receiver having an output proportional to said voltage, and first means connected for control by said output, said first means including a servo amplifier, a first motor driven by said amplifier and a generator driven by said motor and feeding said amplifier for deriving from said receiver output a mechanical torque proportional to the rate of change of said voltage; the second of said channels comprising a position servo loop including a second receiver having an output proportional to said voltage, and second means including a high-gain servo amplifier driven by said output of said second receiver and a motor driven by said second amplifier for deriving therefrom a mechanical torque proportional to said voltage; a mechanical differential driven by the outputs of said first and second motors for adding said outputs and deriving therefrom a torque equal to one half the sum thereof, the output of said first motor being also supplied to said first receiver in such sense as substantially to null the output of said receiver, and the output of said mechanical differential being supplied to said second receiver in such sense as to reduce to zero any residual voltage output thereof and to said first object for driving the same.

6. In a servo system comprising an electrical transmitter and a pair of receivers and connections therebetween for changing the position of a first object in response to a change in position of a second object, means providing a voltage having a characteristic having a magnitude proportional to the displacement of said second object from a reference position, a pair of channels included in said connections and connected in parallel to said means for control thereby, the first of said channels comprising a velocity servo loop including a first receiver having an output proportional to said magnitude, the second of said channels comprising a position servo loop including a second receiver having an output proportional to said magnitude, and means for adding the outputs of said first and second receivers and supplying a torque proportional to the resultant thereof to said second receiver in such sense as to reduce to zero any residual voltage output therefrom, said first object being driven by said last-named means.

References Cited in the file of this patent

UNITED STATES PATENTS

| | | |
|---|---|---|
| 2,115,086 | Riggs | Apr. 26, 1938 |
| 2,561,654 | Eller | July 24, 1951 |
| 2,588,742 | McCallum | Mar. 11, 1952 |
| 2,588,743 | McCallum | Mar. 11, 1952 |
| 2,614,237 | Goertz | Oct. 14, 1952 |